US008643618B2

(12) United States Patent
Yu

(10) Patent No.: US 8,643,618 B2
(45) Date of Patent: Feb. 4, 2014

(54) ELECTROMAGNETIC-TYPE TOUCH INPUT DEVICE, AND TOUCH DISPLAY DEVICE INCORPORATING THE SAME

(75) Inventor: Joe Yu, New Taipei (TW)

(73) Assignee: UC-Logic Technology Corp., New Taipei (TW)

( * ) Notice: Subject to any disclaimer, the term of this patent is extended or adjusted under 35 U.S.C. 154(b) by 129 days.

(21) Appl. No.: 13/230,025

(22) Filed: Sep. 12, 2011

(65) Prior Publication Data

US 2012/0062514 A1 Mar. 15, 2012

(30) Foreign Application Priority Data

Sep. 15, 2010 (TW) ................................ 99131196 A

(51) Int. Cl.
*G06F 3/041* (2006.01)
*G06F 3/045* (2006.01)
(52) U.S. Cl.
USPC .................... 345/173; 345/174; 178/18.07
(58) Field of Classification Search
USPC .................. 345/173, 178–180, 174
See application file for complete search history.

(56) References Cited

U.S. PATENT DOCUMENTS

| 6,492,979 | B1 * | 12/2002 | Kent et al. | 345/173 |
| 7,446,694 | B1 * | 11/2008 | Ahmed et al. | 341/160 |
| 2006/0279548 | A1 * | 12/2006 | Geaghan | 345/173 |
| 2007/0227785 | A1 * | 10/2007 | Katsurahira | 178/18.07 |
| 2008/0284738 | A1 * | 11/2008 | Hovden et al. | 345/173 |

* cited by examiner

*Primary Examiner* — Alexander Eisen
*Assistant Examiner* — Nan-Ying Yang
(74) *Attorney, Agent, or Firm* — The Webb Law Firm

(57) ABSTRACT

An electromagnetic-type touch input device of a touch display device includes: a main sensor board disposed under a liquid crystal display (LCD) module for sensing an electromagnetic wave signal from an electronic stylus upon a touching by the electronic so as to generate a first sensing output; an auxiliary periphery sensor disposed on a top surface of the LCD module configured with a peripheral non-display area surrounding a central display area, and including X-axis and Y-axis antenna coils disposed above said peripheral non-display area of the LCD module for sensing the electromagnetic wave signal from the electronic stylus upon the touching by the electronic stylus so as to generate a second sensing output; and a control unit outputting an input signal associated with a two-dimensional coordinate and corresponding to a location of a touch point of the electronic stylus based on the first and second sensing outputs.

12 Claims, 5 Drawing Sheets

ELECTROMAGNETIC-TYPE TOUCH INPUT DEVICE, AND TOUCH DISPLAY DEVICE INCORPORATING THE SAME

CROSS-REFERENCE TO RELATED APPLICATION

This application claims priority to Taiwanese Application No. 099131196, filed on Sep. 15, 2010.

BACKGROUND OF THE INVENTION

1. Field of the Invention

The invention relates to a touch input device, and more particularly to an electromagnetic-type touch input device, and a touch display device incorporating the same.

2. Description of the Related Art

Referring to FIGS. 1 and 2, a conventional touch display device 9 is shown to use with an electronic stylus 8 capable of radiating an electromagnetic wave signal. The conventional touch display device 9 includes a liquid crystal display (LCD) module 91, an electromagnetic-type touch panel 92 (not shown in FIG. 1) disposed under the LCD module 91, and a frame 94 for holding and receiving the LCD module 91 and the electromagnetic-type touch panel 92 therein. The LCD module 91 has a rectangular display area 911 exposed from the frame 94. As shown in FIG. 2, the electromagnetic-type touch panel 92 includes a sensor board 921, an X-axis multiplexer 922, a Y-axis multiplexer 923, and a controller 924. The sensor board 921 includes an X-axis antenna array consisting of a plurality of X-axis antenna coils and coupled to the X-axis multiplexer 922, and a Y-axis antenna array consisting of a plurality of Y-axis antenna coils and coupled to the Y-axis multiplexer 923. The sensor board 921 senses the electromagnetic wave signal from the electronic stylus 8 upon a touching by the electronic stylus 8 on the display area 911 so as to output respectively an X-axis sensing signal and a Y-axis sensing signal to the X-axis and Y-axis multiplexers 922, 923. The controller 924 is connected electrically to the X-axis and Y-axis multiplexers 922, 923, and is operable to control the X-axis and Y-axis multiplexers 922, 923 to output the X-axis and Y-axis sensing signals to the controller 924 such that the controller 924 generates an input signal corresponding to a location of a touch point of the electronic stylus 8.

In such a conventional touch display device, when the touch point of the electronic stylus 8 is located within a periphery portion of the display area 911, due to external interferences, the sensor board 921 cannot accurately sense the electromagnetic wave signal from the electronic stylus 8. Therefore, complicated calibration for the periphery portion of the display area 911 is required for the touch panel 92. In addition, when the touch point of the electronic stylus 8 is located on a peripheral non-display area 912 of the LCD module 91 surrounding the display area 911 and covered by the frame 94, the touch panel 92 will not generate any input signal, i.e., it is regarded as a non-useful operation. Therefore, improvements may be made to the above techniques.

SUMMARY OF THE INVENTION

Therefore, an object of the present invention is to provide an electromagnetic-type touch input device, and a touch display device incorporating the same that can overcome the aforesaid drawbacks of the prior art.

According to one aspect of the present invention, there is provided a touch display device adapted for use with an electronic stylus capable of radiating an electromagnetic wave signal. The touch display device comprises:

a liquid crystal display (LCD) module having a top surface, the top surface being configured with a central display area, and a peripheral non-display area surrounding the central display area; and an electromagnetic-type touch input device including
a main sensor board disposed under the LCD module for sensing the electromagnetic wave signal from the electronic stylus upon a touching by the electronic stylus so as to generate a first sensing output corresponding to a touch point of the electronic stylus,
an auxiliary periphery sensor disposed on the top surface of the LCD module, and including a plurality of X-axis antenna coils and a plurality of Y-axis antenna coils disposed above the peripheral non-display area of the top surface of the LCD module for sensing the electromagnetic wave signal from the electronic stylus upon the touching by the electronic stylus so as to generate a second sensing output corresponding to the touch point of the electronic stylus, and
a control unit connected electrically to the main sensor board and the auxiliary periphery sensor for receiving the first and second sensing outputs therefrom, the control unit being operable to output an input signal associated with a two-dimensional coordinate and corresponding to a location of the touch point of the electronic stylus based on the first and second sensing outputs.

According to another aspect of the present invention, there is provided an electromagnetic-type touch input device that is adapted to be integrated with a liquid crystal display (LCD) module and that is adapted for use with an electronic stylus capable of radiating an electromagnetic wave signal. The LCD module has a top surface configured with a central display area and a peripheral non-display area surrounding the central display area. The electromagnetic-type touch input device comprises:

a main sensor board adapted to be disposed under the LCD module for sensing the electromagnetic wave signal from the electronic stylus upon a touching by the electronic stylus so as to generate a first sensing output corresponding to a touch point of the electronic stylus;

an auxiliary periphery sensor adapted to be disposed on the top surface of the LCD module, and including a plurality of X-axis antenna coils and a plurality of Y-axis antenna coils disposed above the peripheral non-display area of the top surface of the LCD module for sensing the electromagnetic wave signal from the electronic stylus upon the touching by the electronic stylus so as to generate a second sensing output corresponding to the touch point of the electronic stylus; and a control unit connected electrically to the main sensor board and the auxiliary periphery sensor for receiving the first and second sensing outputs therefrom, the control unit being operable to output an input signal associated with a two-dimensional coordinate and corresponding to a location of the touch point of the electronic stylus based on the first and second sensing outputs.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
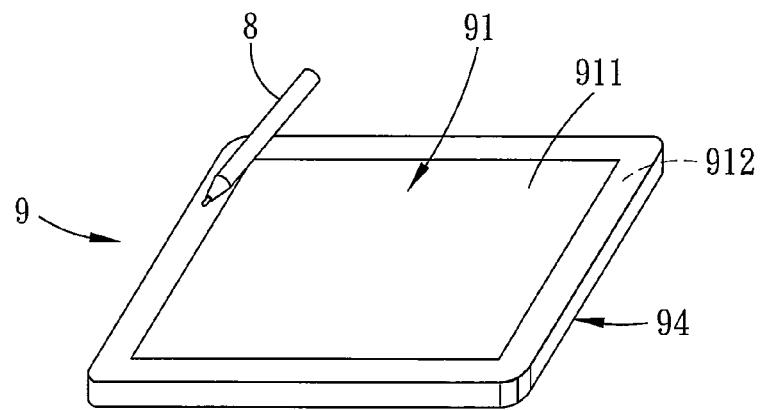
FIG. 1 is a perspective view showing a conventional touch display device.

Before the present invention is described in greater detail, it should be noted that like elements are denoted by the same reference numerals throughout the disclosure.

Figure 3:
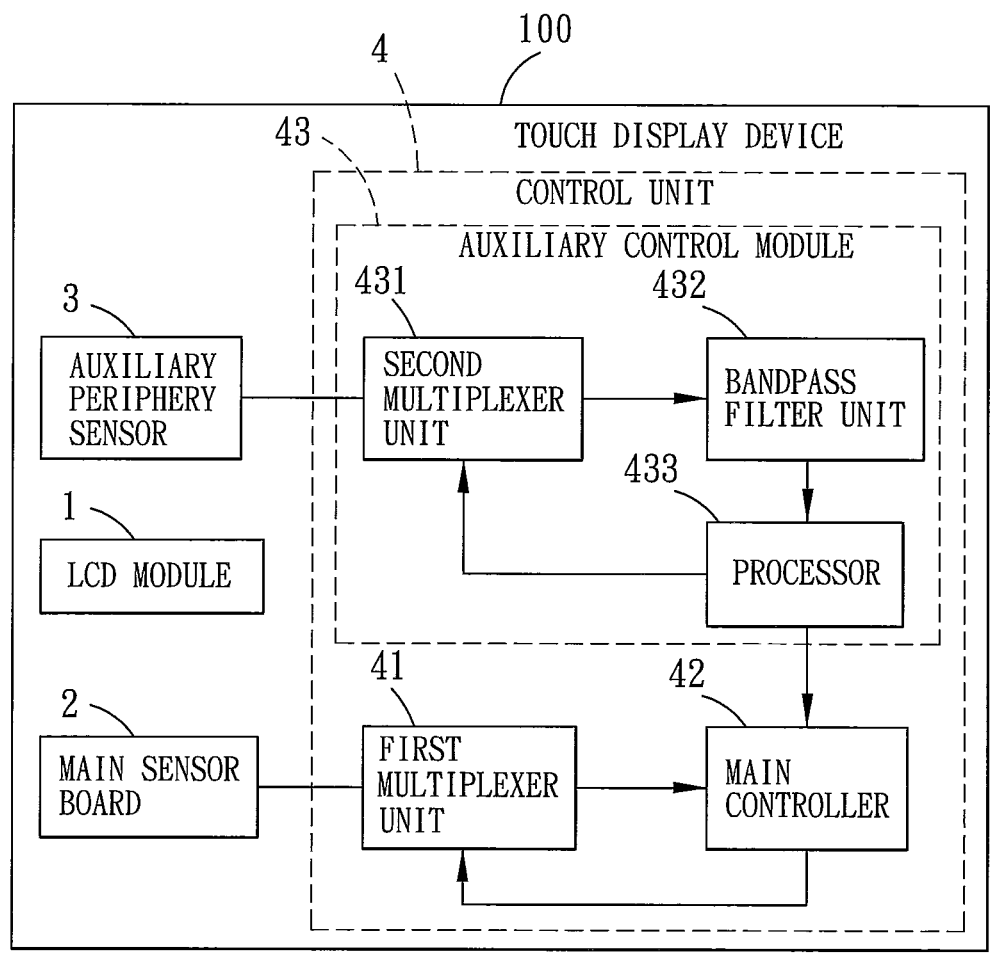
FIG. 3 is a schematic circuit block diagram illustrating the first preferred embodiment of a touch display device according to the present invention.
Figure 4:
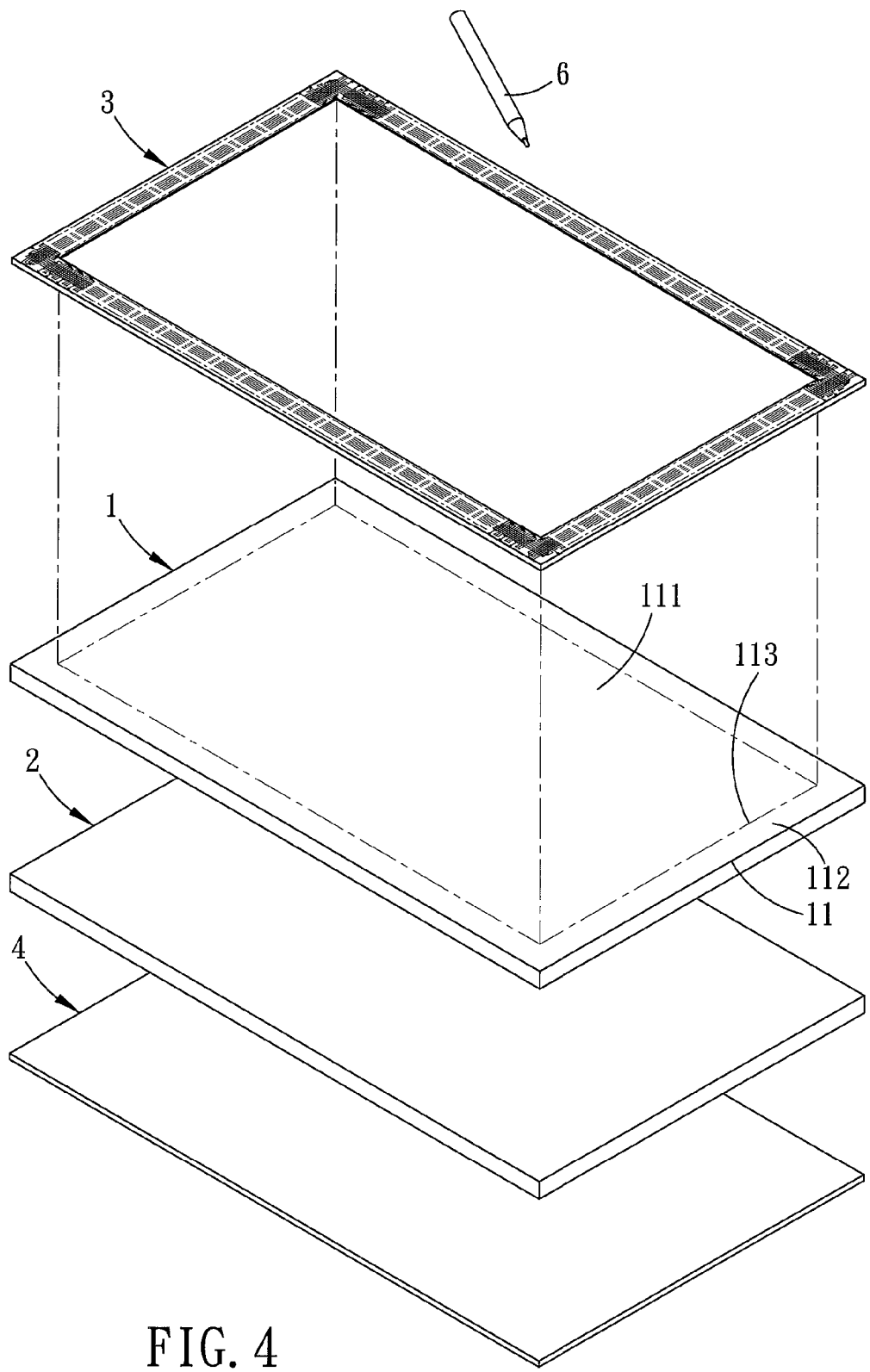
FIG. 4 is an exploded perspective view showing the first preferred embodiment.

Referring to FIGS. 3 and 4, the first preferred embodiment of a touch display device according to the present invention is shown to include an LCD module 1, and an electromagnetic-type touch input device that is adapted for use with an electronic stylus 6 and that includes a main sensor board 2, an auxiliary periphery sensor 3 and a control unit 4. The electronic stylus 6 is capable of radiating an electromagnetic wave signal.

Referring further to FIG. 4, the LCD module 1 has a rectangular top surface 11 that is configured with a rectangular central display area 111, and a peripheral non-display area 112 surrounding the central display area 111.

Figure 2:
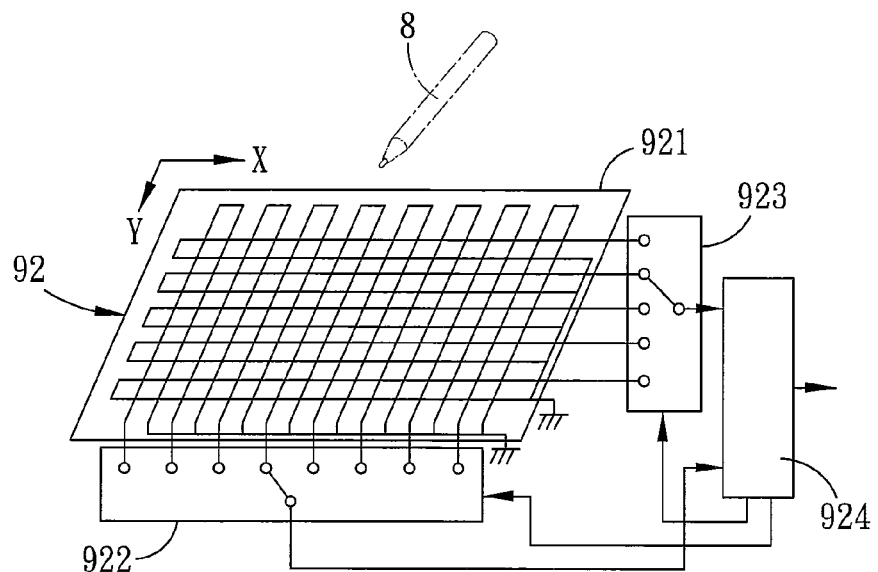
FIG. 2 is a schematic electrical circuit block diagram illustrating an electromagnetic-type touch panel of the conventional touch display device.

The main sensor board 2 is disposed under the LCD module 1 for sensing the electromagnetic wave signal from the electronic stylus 6 upon a touching by the electronic stylus 6 with an operating surface of the touch display device (not shown) so as to generate a first sensing output corresponding to a touch point of the electronic stylus 6. The main sensor board 2 has the same configuration as that of the sensor board 921 of FIG. 2. Since the feature of this invention does not reside in the configuration of the main sensor board 2, which is known to those skilled in the art, details of the same are omitted herein for the sake of brevity.

Figure 5:
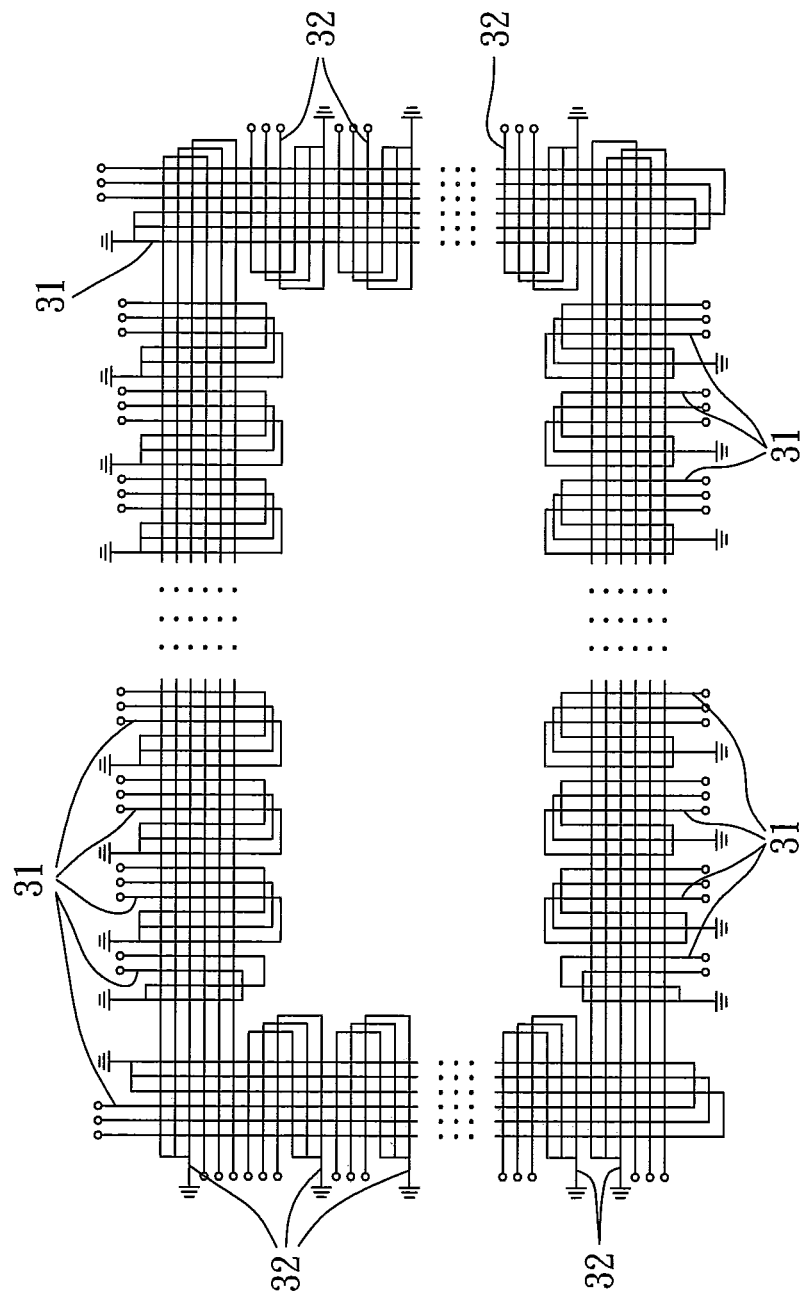
FIG. 5 is a schematic electrical circuit diagram illustrating an auxiliary periphery sensor of the first preferred embodiment.

In this embodiment, the auxiliary periphery sensor 3 is in the form of a looped circuit board having a size corresponding to that of the peripheral non-display area 112 of the top surface 11 of the LCD module 1 and attached to the peripheral non-display area 112 of the top surface 11 of the LCD module 1. The auxiliary periphery sensor 3 includes a plurality of X-axis antenna coils 31 and a plurality of Y-axis antenna coils 32, as shown in FIG. 5, formed into the looped circuit board for sensing the electromagnetic wave signal from the electronic stylus 6 upon the touching by the electronic stylus 6 with the operating surface of the touch display device so as to generate a second sensing output corresponding to the touch point of the electronic stylus 6. In other embodiments, the looped circuit board can be a flexible printed circuit board adhered to the peripheral non-display area 112 of the top surface 11 of the LCD module 1.

The control unit 4 is disposed under the main sensor board 2, and is connected electrically to the main sensor board 2 and the auxiliary periphery sensor 3 for receiving the first and second sensing output therefrom. The control unit 4 is operable to output an input signal associated with a two-dimensional coordinate and corresponding to a location of the touch point of the electronic stylus 6 based on the first and second sensing outputs from the main sensor board 2 and the auxiliary periphery sensor 3.

In this embodiment, the control unit 4 includes a first multiplexer unit 41, an auxiliary control module 43, and a main controller 42.

The first multiplexer unit 41 includes an X-axis multiplexer and a Y-axis multiplexer (not shown) connected electrically to the main sensor board 2 for receiving the first sensing output from the main sensor board 2. The first multiplexer unit 41 is operable to output the first sensing output.

The auxiliary control module 43 includes a second multiplexer unit 431, a bandpass filter unit 432 and a processor 433. The second multiplexer unit 431 is connected electrically to the auxiliary periphery sensor 3 for receiving the second sensing output from the auxiliary periphery sensor 3. The second multiplexer 431 is operable to output the second sensing output. The bandpass filter unit 432 is connected electrically to the second multiplexer unit 431, filters the second sensing output from the second multiplexer unit 431, and generates a filtered sensing output. The processor 433 is connected electrically to the bandpass filter unit 432 and the second multiplexer unit 431. The processor 433 is connected electrically to the bandpass filter unit 432 and the second multiplexer unit 431. The processor 433 controls the second multiplexer unit 431 to output the second sensing output to the bandpass filter unit 432, and processes the filtered sensing output from the bandpass filter unit 432 so as to output a processed sensing output corresponding to the second sensing output.

The main controller 42 is connected electrically to the first multiplexer unit 41 and the processor 433 of the auxiliary control module 43, and controls the first multiplexer unit 41 so that the first multiplexer unit 41 outputs the first sensing output to the main controller 42. The main controller 42 receives the first sensing output from the first multiplexer unit 41 and the processed sensing output from the processor 433 of the auxiliary control module 43, and generates the input signal based on at least one of the first sensing output from the first multiplexer unit 41 and the processed sensing output from the processor 433 of the auxiliary control module 43. More specifically, when the location of the touch point of the electronic stylus 6 is on the central display area 111 of the top surface 11 of the LCD module 1, the main controller 42 generates the input signal based on the first sensing output from the first multiplexer unit 41. When the location of the touch point of the electronic stylus 6 is on a boundary area 113 between the central display area 111 and the peripheral non-display area 112 of the top surface 11 of the LCD module 1, the main controller 42 generates the input signal based on the first sensing output from the first multiplexer unit 41 and the processed sensing output from the processor 433 of the auxiliary control module 43. When the location of the touch point of the electronic stylus 6 is on the peripheral non-display area 112 of the top surface 11 of the LCD module 1, the main controller 42 generates the input signal based on the processed sensing output from the processor 433 of the auxiliary control module 43.

In sum, due to the presence of the auxiliary periphery sensor 3 and the auxiliary control module 43, the touch display device of the present invention can generate an input signal corresponding to a location of a touch point of the electronic stylus 6 on the boundary area 113 between the central display area 111 and the peripheral non-display area 112 of the top surface 11 of the LCD module 1 without complicated calibration operation. In addition, the touch display device can still generate an input signal corresponding to a location of a touch point of the electronic stylus 6 on the peripheral non-display area 112 of the top surface 111 of the LCD module 1. Therefore, the touch display device of the present invention has a relatively large operating area as compared to the prior art.

Figure 6:
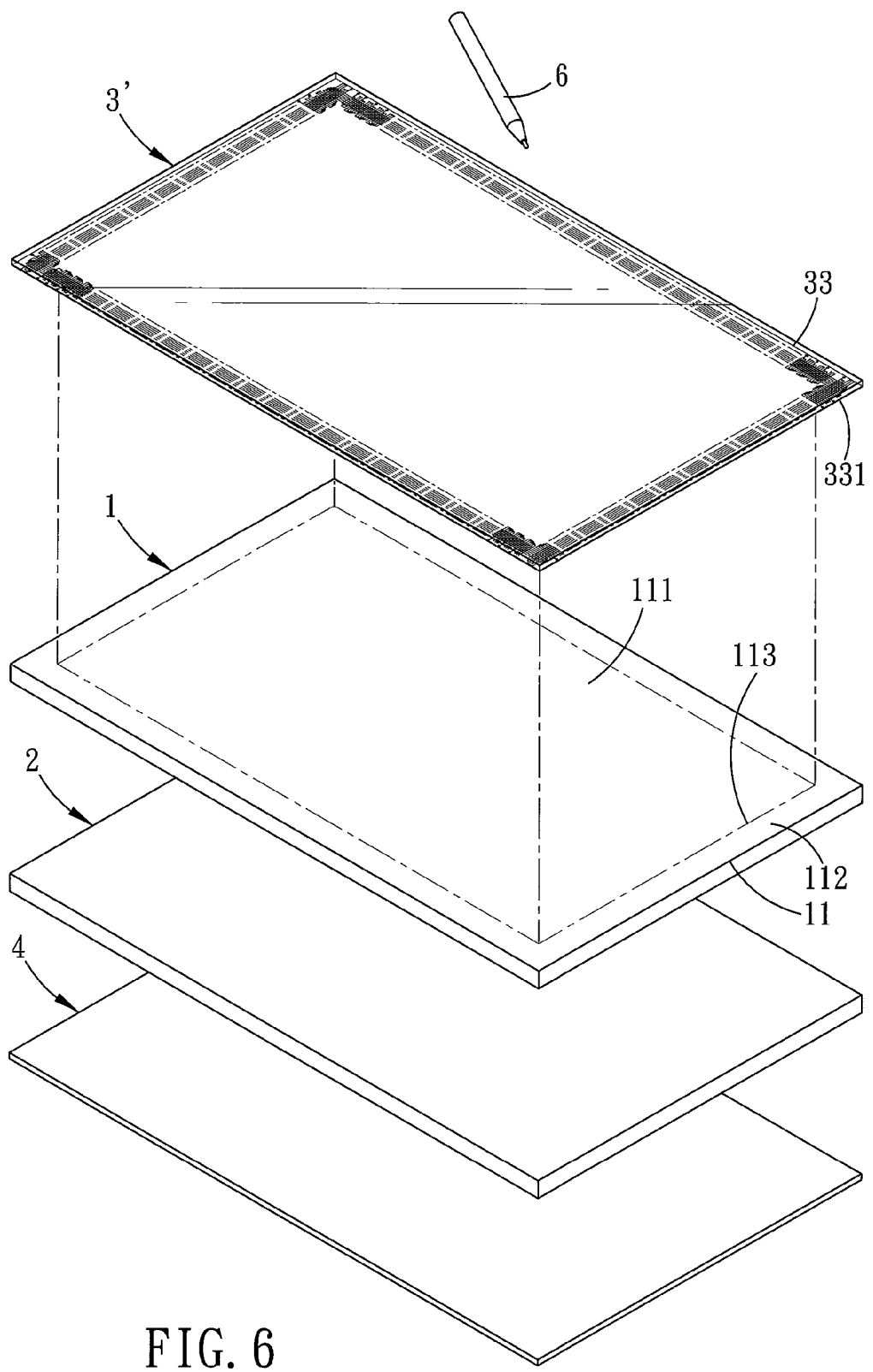
FIG. 6 is an exploded perspective view showing the second preferred embodiment of a touch display device according to the present invention.

FIG. 6 illustrates the second preferred embodiment of a touch display device according to this invention, which is a modification of the first preferred embodiment. In this embodiment, the auxiliary periphery sensor 3' includes a transparent plate 33 attached to the top surface 11 of the LCD module 1. The transparent plate 33 has a bottom surface 331 that has a periphery area corresponding to the peripheral non-display area 112 of the top surface 11 of the LCD module 1 and provided with the X-axis and Y-axis antenna coils 31, 32 thereon such that the X-axis and Y-axis antenna coils 31, 32 are disposed between the LCD module 1 and the transparent plate 33. In this embodiment, the transparent plate 33 can serve as a cover lens of the touch display device.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A touch display device adapted for use with an electronic stylus capable of radiating an electromagnetic wave signal, said touch display device comprising:
    a liquid crystal display (LCD) module having a top surface, said top surface being configured with a central display area and a peripheral non-display area surrounding said central display area; and
    an electromagnetic-type touch input device including
        a main sensor board disposed under said LCD module for sensing the electromagnetic wave signal from the electronic stylus upon a touching by the electronic stylus so as to generate a first sensing output corresponding to a touch point of the electronic stylus,
        an auxiliary periphery sensor disposed on said top surface of said LCD module, and including a plurality of X-axis antenna coils and a plurality of Y-axis antenna coils disposed above said peripheral non-display area of said top surface of said LCD module for sensing the electromagnetic wave signal from the electronic stylus upon the touching by the electronic stylus so as to generate a second sensing output corresponding to the touch point of the electronic stylus, and
        a control unit connected electrically to said main sensor board and said auxiliary periphery sensor for receiving the first and second sensing outputs therefrom, said control unit being operable to output an input signal associated with a two-dimensional coordinate and corresponding to a location of the touch point of the electronic stylus based on the first and second sensing outputs.

2. The touch display device as claimed in claim 1, wherein said auxiliary periphery sensor is in the form of a looped circuit board that is attached to said peripheral non-display area of said top surface of said LCD module and that is formed with said X-axis and Y-axis antenna coils.

3. The touch display device as claimed in claim 2, wherein said looped circuit board is a looped flexible printed circuit board adhered to said peripheral non-display area of said top surface of said LCD module.

4. The touch display device as claimed in claim 1, wherein said auxiliary periphery sensor further includes a transparent plate attached to said top surface of said LCD module, said transparent plate having a bottom surface that has a periphery area corresponding to said peripheral non-display area of said top surface of said LCD module and provided with said X-axis and Y-axis antenna coils thereon such that said X-axis and Y-axis antenna coils are disposed between said LCD module and said transparent plate.

5. The touch display device as claimed in claim 1, wherein said control unit of said electromagnetic-type touch input device includes:
    a first multiplexer unit connected electrically to said main sensor board, receiving the first sensing output from said main sensor board, and operable to output the first sensing output;
    an auxiliary control module including
        a second multiplexer unit connected electrically to said auxiliary periphery sensor, receiving the second sensing output from said auxiliary periphery sensor, and operable to output the second sensing output,
        a bandpass filter unit connected electrically to said second multiplexer unit, filtering the second sensing output from said second multiplexer unit, and generating a filtered sensing output, and
        a processor connected electrically to said bandpass filter unit and said second multiplexer unit, said processor controlling said second multiplexer unit to output the second sensing output to said bandpass filter unit, and processing the filtered sensing output from said bandpass filter unit so as to output a processed sensing output corresponding to the second sensing output; and
    a main controller connected electrically to said first multiplexer unit and said processor of said auxiliary control module, and controlling said first multiplexer unit so that said first multiplexer unit outputs the first sensing output to said main controller, said main controller receiving the first sensing output from said first multiplexer unit and the processed sensing output from said processor of the auxiliary control module, and generating the input signal based on at least one of the first sensing output from said first multiplexer unit and the processed sensing output from said processor of said auxiliary control module.

6. The touch display device as claimed in claim 5, wherein:
    said main controller of said control unit generates the input signal based on the first sensing output from said first multiplexer unit when the location of the touch point of the electronic stylus is on said central display area of said top surface of said LCD module;
    said main controller of said control unit generates the input signal based on the first sensing output from said first multiplexer unit and the processed sensing output from said processor of said auxiliary control module when the location of the touch point of the electronic stylus is on a boundary area between said central display area and said peripheral non-display area of said top surface of said LCD module; and
    said main controller of said control unit generates the input signal based on the processed sensing output from said processor of said auxiliary control module when the location of the touch point of the electronic stylus is on said peripheral non-display area of said top surface of said LCD module.

7. An electromagnetic-type touch input device adapted to be integrated with a liquid crystal display (LCD) module and adapted for use with an electronic stylus capable of radiating an electromagnetic wave signal, the LCD module having a top surface configured with a central display area and a peripheral non-display area surrounding the central display area, said electromagnetic-type touch input device comprising:
- a main sensor board adapted to be disposed under the LCD module for sensing the electromagnetic wave signal from the electronic stylus upon a touching by the electronic stylus so as to generate a first sensing output corresponding to a touch point of the electronic stylus;
- an auxiliary periphery sensor adapted to be disposed on the top surface of the LCD module, and including a plurality of X-axis antenna coils and a plurality of Y-axis antenna coils disposed above the peripheral non-display area of the top surface of the LCD module for sensing the electromagnetic wave signal from the electronic stylus upon the touching by the electronic stylus so as to generate a second sensing output corresponding to the touch point of the electronic stylus; and
- a control unit connected electrically to said main sensor board and said auxiliary periphery sensor for receiving the first and second sensing outputs therefrom, said control unit being operable to output an input signal associated with a two-dimensional coordinate and corresponding to a location of the touch point of the electronic stylus based on the first and second sensing outputs.

8. The electromagnetic-type touch input device as claimed in claim 7, wherein said auxiliary periphery sensor is in the form of a looped circuit board that is adapted to be attached to the peripheral non-display area of the top surface of the LCD module and that is formed with said X-axis and Y-axis antenna coils.

9. The electromagnetic-type touch input device as claimed in claim 8, wherein said looped circuit board is a looped flexible printed circuit board adapted to be adhered to the peripheral non-display area of the top surface of the LCD module.

10. The electromagnetic-type touch input device as claimed in claim 7, wherein said auxiliary periphery sensor further includes a transparent plate adapted to be attached to the top surface of the LCD module, said transparent plate having a bottom surface that has a periphery area corresponding to said peripheral non-display area of said top surface of said LCD module and provided with said X-axis and Y-axis antenna coils thereon such that said X-axis and Y-axis antenna coils are disposed between said LCD module and said transparent plate.

11. The electromagnetic-type touch input device as claimed in claim 7, wherein said control unit includes:
- a first multiplexer unit connected electrically to said main sensor board, receiving the first sensing output from said main sensor board, and operable to output the first sensing output;
- an auxiliary control module including
  - a second multiplexer unit connected electrically to said auxiliary periphery sensor, receiving the second sensing output from said auxiliary periphery sensor, and operable to output the second sensing output,
  - a bandpass filter unit connected electrically to said second multiplexer unit, filtering the second sensing output from said second multiplexer unit, and generating a filtered sensing output, and
  - a processor connected electrically to said bandpass filter unit and said second multiplexer unit, said processor controlling said second multiplexer unit to output the second sensing output to said bandpass filter unit, and processing the filtered sensing output from said bandpass filter unit so as to output a processed sensing output corresponding to the second sensing output; and
- a main controller connected electrically to said first multiplexer unit and said processor of said auxiliary control module, and controlling said first multiplexer unit so that said first multiplexer unit outputs the first sensing output to said main controller, said main controller receiving the first sensing output from said first multiplexer unit and the processed sensing output from said processor of the auxiliary control module, and generating the input signal based on at least one of the first sensing output from said first multiplexer unit and the processed sensing output from said processor of said auxiliary control module.

12. The electromagnetic-type touch input device as claimed in claim 11, wherein:
- said main controller of said control unit generates the input signal based on the first sensing output from said first multiplexer unit when the location of the touch point of the electronic stylus is on the central display area of the top surface of the LCD module;
- said main controller of said control unit generates the input signal based on the first sensing output from said first multiplexer unit and the processed sensing output from said processor of said auxiliary control module when the location of the touch point of the electronic stylus is on a boundary area between the central display area and the peripheral non-display area of the top surface of the LCD module; and
- said main controller of said control unit generates the input signal based on the processed sensing output from said processor of said auxiliary control module when the location of the touch point of the electronic stylus is on the peripheral non-display area of the top surface of the LCD module.

* * * * *